US012669456B2

(12) United States Patent (10) Patent No.: US 12,669,456 B2

Heine et al. (45) Date of Patent: Jun. 30, 2026

(54) STIRRING APPARATUS FOR A FLASH POINT DETERMINATION APPARATUS COMPRISING A SELECTIVELY REMOVABLE STIRRING DEVICE

(71) Applicant: ANTON PAAR PROVETEC GMBH, Blankenfelde-Mahlow (DE)

(72) Inventors: Christian Andreas Heine, Berlin (DE); Robert Skole, Berlin (DE); Benjamin Williams, Werder Havel (DE); Florian Strasser, Berlin (DE); Xenia Tuaev, Berlin (DE)

(73) Assignee: Anton Paar ProveTec GmbH, Blankenfelde-Mahlow (DE)

( * ) Notice: Subject to any disclaimer, the term of this patent is extended or adjusted under 35 U.S.C. 154(b) by 1214 days.

(21) Appl. No.: 17/597,429

(22) PCT Filed: Jun. 17, 2020

(86) PCT No.: PCT/EP2020/066714

§ 371 (c)(1),
(2) Date: Jan. 5, 2022

(87) PCT Pub. No.: WO2021/013436

PCT Pub. Date: Jan. 28, 2021

(65) Prior Publication Data

US 2022/0283107 A1    Sep. 8, 2022

(30) Foreign Application Priority Data

Jul. 23, 2019    (DE) ..................... 10 2019 119 918.2

(51) Int. Cl.
G01N 25/50    (2006.01)
B01F 27/09    (2022.01)
G01N 1/38    (2006.01)

(52) U.S. Cl.
CPC ............. G01N 25/50 (2013.01); B01F 27/09 (2022.01); G01N 1/38 (2013.01)

(58) Field of Classification Search
CPC .......... B01F 27/09; B01F 27/88; B01F 35/31; G01N 25/52; G01N 25/50
See application file for complete search history.

(56) References Cited

U.S. PATENT DOCUMENTS

| | | | |
|---|---|---|---|
| 2,823,824 A | 2/1958 | Richardson | |
| 5,094,542 A | 3/1992 | Engels et al. | |
| 5,145,250 A | 9/1992 | Planck et al. | |
| 5,869,343 A * | 2/1999 | Handschuck | .......... G01N 25/52 |
| | | | 73/36 |

(Continued)

FOREIGN PATENT DOCUMENTS

| | | |
|---|---|---|
| CN | 2632672 Y | 8/2004 |
| CN | 2856384 Y | 1/2007 |

(Continued)

OTHER PUBLICATIONS

US 5,149,194 A, 09/1992, Engels et al. (withdrawn)

(Continued)

*Primary Examiner* — Elizabeth Insler

(74) *Attorney, Agent, or Firm* — Dicke, Billig & Czaja, PLLC

(57) ABSTRACT

Stirring device for stirring a sample in a container which is closable by a lid, for a flash point determination test and/or combustion point determination test, wherein the stirring device comprises a stirring unit which may extend at least partially through the lid for stirring the sample which is arranged in the container, a drive unit which is to be arranged at least partially outside of the lid, for driving, in particular rotationally driving, the stirring unit, a coupling unit for coupling the stirring unit with the drive unit, and an actuation unit which, in particular for adjusting the coupling unit, is actuatable such that selectively in a first actuation position, when pulling up the drive unit, the lid is detachable (Continued)

from the container commonly with the stirring device, or in a second actuation position, when pulling up the drive unit, the drive unit is detachable from the container, and the stirring unit and the lid remain at the container.

20 Claims, 7 Drawing Sheets

(56) References Cited

U.S. PATENT DOCUMENTS

| | | | |
|---|---|---|---|
| 10,161,402 | B2 | 12/2018 | Cramer |
| 2005/0128865 | A1 | 6/2005 | Chiappetta |
| 2007/0286018 | A1 | 12/2007 | Markle et al. |
| 2013/0088934 | A1* | 4/2013 | Gouin ..................... B01F 27/88 |
| | | | 366/282 |
| 2013/0340346 | A1 | 12/2013 | Ueda et al. |
| 2018/0169595 | A1* | 6/2018 | Mott .................. B01F 35/4111 |
| 2019/0257340 | A1 | 8/2019 | Stock |

FOREIGN PATENT DOCUMENTS

| | | |
|---|---|---|
| CN | 2856385 | 1/2007 |
| CN | 201214155 | 4/2009 |
| CN | 202075255 U | 12/2011 |
| CN | 103415670 | 11/2013 |
| CN | 204458911 | 7/2015 |
| CN | 105209266 | 12/2015 |
| CN | 105829722 | 8/2016 |
| CN | 206154350 | 5/2017 |
| CN | 206311531 U | 7/2017 |
| DE | 196 09 413 C1 | 7/1997 |
| DE | 297 20 027 U1 | 2/1998 |
| JP | H10002869 A | 1/1998 |
| JP | 2010196812 A | 9/2010 |

OTHER PUBLICATIONS

Japanese Office action for Application No. 2021-576215, dated Janaury 9, 2024, 8 pages.
Chinese Office action for Application No. 2020800529269, dated Aug. 17, 2023, 18 pages.
International Search Report & Written Opinion of PCT/EP2020/ 066714, Oct. 20, 2020, 16 pp.
DE Office Action of 10 2019 119 918.2, Mar. 4, 2021, 6 pp.
https://www.anton-paar.com/corp-de/produkte/details/rheometer-mcr-102-302-502/, 78 pp.

* cited by examiner

STIRRING APPARATUS FOR A FLASH POINT DETERMINATION APPARATUS COMPRISING A SELECTIVELY REMOVABLE STIRRING DEVICE

This application is a national US phase of PCT/EP2020/066714 which claims the benefit of the filing date of the German Patent Application No. 10 2019 119 918.2 filed 23 Jul. 2019, the disclosure of which is hereby incorporated herein by reference.

TECHNICAL FIELD

Embodiments of the invention relate to a stirring device and a method for stirring a sample in a container which is closable by a lid for a flash point is determination test and/or combustion point determination test, as well as a flash point determination apparatus.

Technological Background

In the field of flash point examination, flash point testers are used for a determination of the flash point. The flash point is the lowest temperature of a sample, at which the application of an ignition source causes the ignition of the vapors which are formed over the liquid. This examination method is determined by numerous standards, for example ASTM D93, EN ISO 2719.

For example, a corresponding flash point tester serves for the characterization of combustibles (for example diesel, kerosene, heating oil), solvents, lubrication oils, or chemicals. For a determination of the flash- and/or combustion point, a defined amount of a substance to be examined is filled into a measuring crucible, heated in a controlled manner, and stirred, if necessary. A gaseous phase is continuously formed above the liquid sample. In periodic time- and/or temperature distances, an ignition source is inserted in the crucible or is moved above the open crucible, to ignite the gas-air-mixture which is formed above the liquid sample. When a flame is detected, whose combustion duration is shorter than 5 s, the flash point is determined. If the combustion duration is longer than 5 s, the combustion point of the sample is determined.

For the flash point determination, different standard methods are suitable, for example the method according to i) Pensky, ii) Pensky-Martens, iii) Abel, iv) Abel-Pensky, v) Tagliabue, and vi) Cleveland.

It may be desirable or necessary, that a sample may be stirred at a pregiven rotational speed (for example up to 500 rpm). For this purpose, a stirrer which is driven from above may be placed in the crucible lid. The coupling between the stirrer and the vertically movable drive which is placed above it serves for a transfer of the torque. For this purpose, in a sample insert of such a flash point tester, a stirrer is positioned in the crucible lid, which immerses in the sample below a lid level and is mechanically driven above.

General prior art is disclosed in CN 206311531 U, DE 19609413 C1, U.S. Pat. No. 2,823,824 A, DE 29720027 U1, CN 2632672 Y, and CN 202075255 U.

SUMMARY OF THE INVENTION

There may be a need to provide a flexibly operable flash point determination apparatus.

The subject matters with the features according to the independent patent claims are provided. Further embodiments are shown in the dependent claims.

According to an embodiment of the present invention, a stirring device for stirring a sample in a container which is closable by a lid for a flash point determination test and/or combustion point determination test is provided, wherein the stirring device comprises a stirring unit which may extend at least partially through the lid for stirring the sample which is arranged in the container, a drive unit which is to be arranged at least partially outside of the lid, for driving (in particular rotationally driving) the stirring unit, a coupling unit for coupling the stirring unit with the drive unit, and an actuation unit which is (preferably, but not mandatorily for adjusting the coupling unit) actuatable such that selectively in a first actuation position, when pulling up the drive unit, the lid is detachable commonly with the stirring unit from the container, or in a second actuation position, when pulling up the drive unit, the drive unit is detachable from the container and the stirring unit and the lid remain at the container.

According to another embodiment of the present invention, a flash point determination apparatus is provided, in particular also for a combustion point determination, wherein the flash point determination apparatus comprises a container for receiving a sample to be examined, a lid for closing the container, and a stirring device with the above described features for stirring the sample in the container which is closable by the lid.

According to a further exemplary embodiment, a method for stirring a sample in a container which is closable by a lid for a flash point determination test and/or combustion point determination test is provided, wherein the method comprises at least partially guiding a stirring unit through the lid into the sample in the container for stirring the sample, driving (in particular rotationally driving) the stirring unit by a drive unit which is at least partially arranged outside of the lid, for stirring the sample by the stirring unit, coupling the stirring unit with the drive unit by a coupling unit, and actuating an actuation unit (preferably, but not mandatorily for adjusting the coupling unit) such that selectively in a first actuation position of the actuation unit, when pulling up the drive unit, the lid is detached commonly with the stirring unit from the container, or in a second actuation position (which may be different from the first actuation position) of the actuation unit, when pulling up the drive unit, the drive unit is detached from the container and the stirring unit and the lid remain at the container.

In the context of the present application, a "stirring device" may denote an apparatus which, by a stirring shaft or the like which is provided with stirring blades, may stir a sample which is arranged in a container, by the stirring shaft or the like being subjected to a rotational motion, such that the stirring blades set the sample into motion. The stirring shaft or the like may be driven (in particular rotationally driven) by a drive unit which may in particular comprise a motor.

In the context of the present application, a "flash point determination test and/or combustion point determination test" may in particular denote a test of a sample with respect to the temperature, at which an inflammation of the sample (for example for less than 5 seconds) and/or a burning of the sample (in particular for more than 5 seconds) occurs.

In the context of the present application, a "stirring unit" may denote a component which performs the actual stirring of the sample in the container. In other words, the stirring unit may be driven, in particular rotationally driven, to set the sample into motion by stirring blades or the like.

In the context of the present application, the term "drive unit" may in particular denote a component which acts upon the stirring unit, such that the drive unit moves, in particular sets into rotation, the stirring unit. Therefore, the drive unit may comprise a movable element, in particular a drive shaft, which is rotationally driven, for example by a motor, to transfer this motion to the stirring unit.

In the context of the present application, the term "coupling unit" may in particular denote a component which mechanically couples and/or decouples the stirring unit with the drive unit. Thus, such a coupling unit enables a force transmission between the stirring unit and the drive unit, and may at the same time, depending on an operation mode and/or an actuation position, perform a selective coupling or decoupling of certain components of the stirring unit and the drive unit.

In the context of the present application, the term "actuation unit" may denote an assembly which is in particular actuatable by hand or manually by a user, actuatable by a tool, or automatically actuatable by a control unit, which actuation unit may be brought in different actuation positions, to adjust which components of the stirring device and/or the flash point determination apparatus shall be coupled with each other, and which components shall be decoupled from each other.

In the context of the present application, the term "flash point determination apparatus" may in particular denote an apparatus which is suitable and/or configured for performing a flash point determination of a sample in a container. In particular, such a flash point determination apparatus may alternatively or additionally be configured to perform a combustion point determination test at a sample which is arranged in a container.

According to an exemplary embodiment of the invention, a stirring device is provided, which comprises a coupling unit which may be brought in different operation conditions by an actuation unit, between a stirring unit for stirring a sample and a drive unit for mechanically driving the stirring unit. By being able to bring the actuation unit in an intuitive manner either in a first actuation position or in a second actuation position, under maintenance of a torque transfer between the stirring unit and the drive unit, it may be selectively adjusted by a user, if, when detaching the drive unit from the container, the lid of the flash point determination apparatus is co-detached with the stirring unit which is connected with it, or not. When detaching the drive unit, it may be advantageous to remain the stirring unit and the lid mounted at the container, for example to let a flash point determination and combustion point determination, respectively, undisturbed, or to prevent a leakage of gases above the sample. However, in other applications, it may be desirable for a user to detach also the stirring unit with the lid from the container when detaching the drive unit. For example it may be advantageous with respect to the fact that in certain application scenarios, cleaning of the stirring unit may be desirable. According to an embodiment of the invention, a user may switch, by merely intuitively transferring the actuation unit between two actuation positions, between the both mentioned operation modes. A further activity of the user and/or a control unit is not desired for this purpose. Therefore, with a low effort, in an error-robust manner, and also without special knowledge, selectively an especially properly reproducible flash point determination and/or combustion point determination without the risk of leakage of gases above the sample, or a simple accessibility and a cleaning possibility of the stirring unit which is performable with low effort, is enabled.

Alternatively to providing a coupling unit which may be brought in different operation conditions by the actuation unit, a transfer between the both operation modes may also be performed by actuating a locking unit (which is for example configured for selectively locking or unlocking the lid and the container) by a user.

According to an embodiment of the invention, an actuation unit (for example advantageously comprising an actuation sleeve) which is cooperating with an agitator coupling and/or coupling unit is provided, which may be manually placed on the stirrer and/or the stirring unit from above and may be pushed downwardly. Depending on the position of the actuation unit (in particular said sleeve), a drive shaft of the drive unit may be fixed at the upper part of the stirring unit or not. By such an agitator coupling, the user has the choice between two operation modes (a) and (b), which correspond to two different actuation positions of the actuation unit:

(a) entrainment of the container lid (crucible lid entrainment) after the end of the test:

This enables a simple, rapid cleaning of the lid without completely disassembling the stirring device and/or the flash point determination apparatus. In this way, after the end of the measurement, the lid may be positioned in a hanging way, and the stirring unit may be freely accessible for wiping off the sample residues. With a simple movement, the lid may be completely removed from the flash point determination apparatus, if desired, and may be cleaned separately. A function of the coupling position which is important for the user-friendliness is that the sample throughput may be significantly increased, when the lid of the container, after a measurement by the flash point determination apparatus, is lifted and may be brought in a position, in which the lower part of the stirring unit may be easily cleaned from sample residues.

(b) no detachment of the lid from the container after the end of the test:

according to this operation condition and/or this actuation position, the container lid may remain on the container. Thereby, a load by sample vapors may be reliably prevented, until the decision for removing the sample insert from the flash point determination apparatus is actively made. The filled container and/or crucible which is closed by the lid may be removed from the flash point determination apparatus by a user after the measurement. The user may dispose the sample and may separately clean the container and the lid (in particular both parts of a two-part lid). Advantageously, this may be performed below a fume cupboard with a corresponding solvent.

In the following, additional exemplary embodiments of the stirring device, the method, and the flash point determination apparatus are described.

According to a preferred embodiment, the coupling unit and the actuation unit may be configured in a cooperating manner, such that:

both in the first actuation position and in the second actuation position of the actuation unit, a transfer of torque from the drive unit to the stirring unit for stirring the sample is enabled; and in the first actuation position, the drive unit and the stirring unit are coupled with each other in an axially undetachable manner, and in the second actuation position, the drive unit and the stirring unit are decoupled from each other in an axially detachable manner.

Then it is ensured, that in both actuation positions, a torque coupling from the drive unit to the stirring unit is enabled, but only in the first actuation position, a detachment of the drive unit from the container also leads to a detachment of the stirring unit from the container, but not in the second actuation position.

According to an embodiment of the invention, the coupling unit may comprise a first component which is assigned to the drive unit (in particular which is connected to the drive unit, or which is integrally formed with the drive unit), and a second component which is assigned to the stirring unit (in particular which is connected to the stirring unit, or which is integrally formed with the stirring unit). When the coupling unit is configured with two components, of which one may for example form a part of the stirring unit, and the other one may for example form a part of the drive unit, the number of the components to be handled when mounting or demounting the stirring device is kept low. At the same time, at the boundary between the first component and the second component, an element-decoupling may be performed, which are separated from each other when detaching the drive unit without detaching the stirring unit. In contrast, in another operation mode, in which, with detaching the drive unit, also the stirring unit (in particular with the lid) shall be detached, the both components may be axially fixedly connected to each other.

According to an embodiment of the invention, the coupling unit may comprise at least one first locking body (in particular at least one first locking ball, preferably a first ball row), which locks the first component with the second component (in particular in a torque-transferring manner), when the actuation unit in the first actuation position acts upon the at least one first locking body. For example, the at least one locking body may be configured as a circumferential arrangement of multiple locking balls, which are lockingly actuatable by the actuation unit (for example an inner protrusion at the actuation unit), when the actuation unit is in the first actuation position. In this case, the at least one first locking body accomplishes a torque-transferring and axially fixed connection between both components and thus between the stirring unit and the drive unit.

According to an embodiment of the invention, the at least one first locking body may unlock and/or release the first component and the second component, when the actuation unit is in the second actuation position and releases the at least one first locking body. When the actuation unit is in the second actuation position, the above described protrusion or the like at an inner side of the actuation unit which is sleeve-shaped or collar-shaped, for example, may release the at least one first locking body, whereby a detachability of the drive unit from the stirring unit is enabled by an axial separability of the both components of the coupling unit.

According to an embodiment of the invention, the coupling unit may comprise a carrier (German: Mitnehmer) for a selective torque-transfer between the first component and the second component. Said carrier may be provided separately from the stirring unit and the drive unit. For example, the carrier may be inserted in the second component. By the fact that the coupling unit may be manufactured (under implementation of one or more locking bodies, if necessary) only of three main components (namely the first component, the second component, and the carrier), a simple manufacture and an error-robust operation are ensured.

According to an embodiment of the invention, the coupling unit may comprise at least one second locking body (in particular at least one second locking ball, for example a second ball row), which acts upon the carrier, in particular in a torque-transferring manner, when the actuation unit in the second actuation position acts upon the at least one second locking body. For example, the at least one second locking body may be configured as a second row of locking balls, which may be arranged in a circumferential direction and may be positioned further away from the container than the first ball row. When the drive unit is mounted at the stirring unit, a rotational drive of the stirring unit by the drive unit may be enabled. In contrast, when the drive unit is detached, due to the at least one first locking body which is now unlocked, the drive unit may be detached without removing the stirring unit with the lid from the container.

According to an embodiment of the invention, the at least one second locking body does not act upon the carrier, when the actuation unit is in the first actuation position and releases the at least one second locking body. When the actuation unit is in the first actuation position, the at least one second locking body does not act upon the carrier. The torque-transferring coupling between the drive unit and the stirring unit may in this case be performed via the at least one first locking body which is now locked. Therefore, rotationally driving the stirring unit by the drive unit is enabled, as well as commonly detaching the drive unit and the stirring unit from the container.

According to an embodiment of the invention, the second component may comprise a tapering outer profile and the first component may comprise a tapering inner profile for receiving the tapering outer profile. The both profiles of the first component and the second component which correspond to each other descriptively serve as mechanical guide when connecting between the first component and the second component of the coupling unit. This simplifies for a user to transfer the coupling unit into a coupled state.

According to an embodiment of the invention, the tapering outer profile may comprise an (in particular surrounding) indentation for receiving the at least one first locking body. For example, the indentation may be configured as an annular groove which comprises circumferential indentations between connecting bars, for example, so that a respective first locking body may be inserted into a respective indentation.

According to an embodiment of the invention, the tapering inner profile may comprise an (in particular surrounding) indentation for receiving the at least one second locking body. The indentation at the inner profile may be configured similarly as the indentation at the outer profile.

According to an embodiment of the invention, the second component may comprise a recess which is central and close to the axis, respectively, for receiving at least a part of the carrier. By being able to accommodate the carrier close to the center in a corresponding recess of the second component, a space- and compact configuration is enabled.

According to an embodiment of the invention, the actuation unit may be configured as a sleeve or collar which is at least partially surrounding the coupling unit, or may comprise such a sleeve or collar. The sleeve and collar, respectively, may additionally at least partially surround the stirring unit and/or the drive unit. Descriptively speaking, the sleeve and collar, respectively, thus comprises a through hole in which at least a part of the coupling unit and optionally a part of the stirring unit and/or the drive unit may be received. When the actuation unit comprises a sleeve, at the one hand, it may protect the received coupling unit against mechanical impact and dirt from the environment. On the other hand, it is enabled that a user, by merely intuitively actuating the sleeve-shaped actuation unit, may transfer the stirring device between the first and the second actuation position in a simple manner.

According to an embodiment of the invention, for transferring between the first actuation position and the second actuation position, the sleeve may be configured axially displaceable. In particular, this may be performed such that, for transferring from the first actuation position to the second actuation position, the sleeve is to be displaced in the direction of the drive unit, and for transferring from the second actuation position to the first actuation position, the sleeve is to be displaced in the direction of the stirring unit. Therefore, for transferring the actuation unit between both actuation positions, it is sufficient that a user, in an especially intuitive manner, displaces the sleeve along an axial extension direction of the stirring device upwardly or downwardly. For example, a sleeve position "down" may correspond to the first actuation position, whereas a sleeve position "up" may correspond to the second actuation position.

According to an embodiment of the invention, the sleeve may comprise at least one inner protrusion for acting upon the coupling unit. It is also possible, that the at least one inner protrusion is configured for acting upon the at least one first locking body and/or the at least one second locking body. For example, such an inner protrusion may be configured continuously or interruptedly in the circumferential direction. Advantageously, the inner protrusion in the first actuation position may act upon the at least one first locking body, and in the second actuation position may act upon the at least one second locking body. In this way, the at least one inner protrusion of the sleeve in the first actuation position may cause both a torque-coupling between the drive unit and the stirring unit, and an axial coupling between the drive unit and the stirring unit. Furthermore, in the second actuation position, the at least one inner protrusion of the sleeve may accomplish only a torque-coupling between the drive unit and the stirring unit, but may leave the drive unit and the stirring unit axially uncoupled.

According to an embodiment of the invention, the actuation unit may be configured for a manual, in particular one-handed, actuation by a user. According to an embodiment of the invention, the method may comprise one-handedly actuating the actuation unit for adjusting the coupling unit by a user. Thus, it may be possible for a user to transfer the actuation unit between both actuation positions by only one hand. Therefore, the other hand of the user is free, to perform other actions during the operation of the stirring device and/or the flash point determination architecture. This enables a simple and error-robust handling of the stirring device.

According to an embodiment of the invention, the coupling unit may comprise at least one locking body (which is in particular loadable with a biasing force) for locking (in particular in a torque-transferring manner) the first component with the second component. Furthermore, the actuation unit may comprise at least one actuation element (in particular at least one actuation screw). It may be configured for locking the at least one locking body by attaching the at least one locking body to at least one of the first component and the second component in the first actuation position. Furthermore, the at least one actuation element may be configured for unlocking the at least one locking body by removing the at least one locking body from the first component and/or the second component in the second actuation position. According to the described alternative configuration, an especially simple coupling unit is provided which nevertheless enables a transfer of the stirring device between both actuation positions and the corresponding functionalities. One or more locking bodies, for example locking balls, may be loaded with a biasing force, for example by a mechanical spring or by a magnetic force. In this case, it may be sufficient to insert an actuation element (for example a respective screw) in a recess of a component of the coupling unit, to bring the locking body or the locking bodies into engagement with a groove of a component of the coupling unit. Thereby, the components of the coupling unit may be coupled with each other and, as result, also the stirring unit and the drive unit may be coupled with each other. If a user does not desire a coupling between both components of the coupling unit and/or between the drive unit and the stirring unit, the actuation element is screwed out of the corresponding reception. Also thereby, a simple transfer between both actuation position is enabled.

In an alternative or additional embodiment, the actuation element may comprise a locking unit (in particular a latch) which may be selectively brought in the first actuation position or in the second actuation position, for example is displaceable between the first actuation position and the second actuation position, manually by a user or alternatively in an automatized manner. For example, such a latch may be positioned in the vicinity of the crucible lid and may be brought in a position by a user, in which the latch locks the lid at the container and therefore prevents the co-transport of the crucible lid. In this case, it may be omitted that the user actuates screws. For example, the locking unit may be configured as a mechanical locking unit, for example as displaceable latch and/or as a clip. Such a mechanical locking unit may also be biased in a certain position by a biasing element, for example a mechanical spring. However, it is also possible to configure the locking unit as a magnetic locking unit which performs a locking and/or unlocking by a magnetic force. The selective locking by the locking element may in particular be performed between the container and the lid, or may act upon the coupling unit.

According to an embodiment of the invention, the flash point determination apparatus may comprise a tempering unit for tempering the sample which is arranged in the container. By tempering the sample, the flash point determination and/or combustion point determination may be performed in a simple and precise manner.

According to an embodiment of the invention, the flash point determination apparatus may comprise an ignition device for igniting the sample. The ignition device may cause igniting the flammable and combustible sample. Preferably, the ignition device extends up to the interior of the container, further preferably extends up to above a liquid surface of the sample.

According to an embodiment of the invention, the stirring unit may be fixedly attached to the lid. By attaching the stirring unit at the lid (for example by screwing), it may be ensured, that, when detaching the stirring unit, also the lid is taken away. Separately removing the lid from the stirring unit is therefore expendable.

Furthermore, the flash point determination architecture may have a temperature probe for detecting the temperature of the sample and/or in the interior of the container. Such a temperature probe may deliver sensor data from the container interior, which may be useful for the detection of the combustion point and/or flash point of the sample.

For example, by embodiments of the present invention, the following standards for flash point testers may be supported: ASTM D93, DIN EN ISO 2719, GB/T261, IP 34, JIS K 2265, ISO 13736, ISO 1516, ISO 1523, DIN 51755-1 (Abel-Pensky with corresponding accessories); ASTM D56, ASTM D3934, ASTM D3941; ASTM D92, DIN EN ISO 2592, IP 36, IP 403. Other embodiments of the present invention may correspond to further standards which are not listed here.

DETAILED DESCRIPTION OF EXEMPLARY EMBODIMENTS

In the following, exemplary embodiments of the present invention are described in detail with reference to the following figures.

Same or similar components in different figures are provided with the same reference numbers.

Before, referring to the figures, exemplary embodiments of the invention are described, some general aspects of the invention and the basic technologies shall be explained:

According to an exemplary embodiment of the invention, a flash point determination apparatus and/or a flash point measurement technique may be provided, which provide possibilities to actively decide, before the measurement, if a container lid or crucible lid shall be co-lifted from a head and/or the part of the apparatus in which the drive device is arranged, or shall remain on the container or crucible after the end of the measurement.

A conventional embodiment couples the head with the sample insert at each placing on the crucible, and consequently remains coupled. In other conventional embodiments, the head and the sample insert remain always decoupled. After the end of the test, the lid is always co-transported with the head and is brought in a tilted position. In this case, sample residues may move from the agitator in the direction of a lid opening and may additionally contaminate the lid. Decoupling the crucible lid with a movement of a hand (as according to an exemplary embodiment of the invention) is not possible, since, additionally to elaborately releasing the coupling, also all connected cables (in particular ignition cables, detector cables, etc.) have to be separately disconnected, before the lid can be released from the flash point determination apparatus.

Another conventional embodiment does not enable a detachment of the lid at all. The component is fixedly connected with the head.

By the cooperation of the coupling unit and the actuation unit of a stirring device according to an exemplary embodiment of the invention, in particular the following advantages may be achieved:

When selecting a first actuation position for causing a co-transport of the crucible lid after the end of the test, a simple, rapid cleaning of the lid without a complete demounting may be achieved. In particular, the lid may be positioned in a hanging manner after the end of the measurement. Then, the stirring unit is freely accessible for wiping off the sample residues. By a simple movement of a hand, the lid may be completely removed from the flash point determination apparatus, if desired.

When selecting another second actuation position for remaining the crucible lid on the crucible, the sample may be effectively protected against contamination. Furthermore, the environment may be protected against sample vapors, until a removal of the sample insert from the flash point determination apparatus is actively performed. For example, a measurement may be started in a supervised manner, may be finished in a non-supervised manner, and a decision for the removal of the sample insert is performed only later (hours later, for example). The environment and the sample remain protected.

Figure 1:
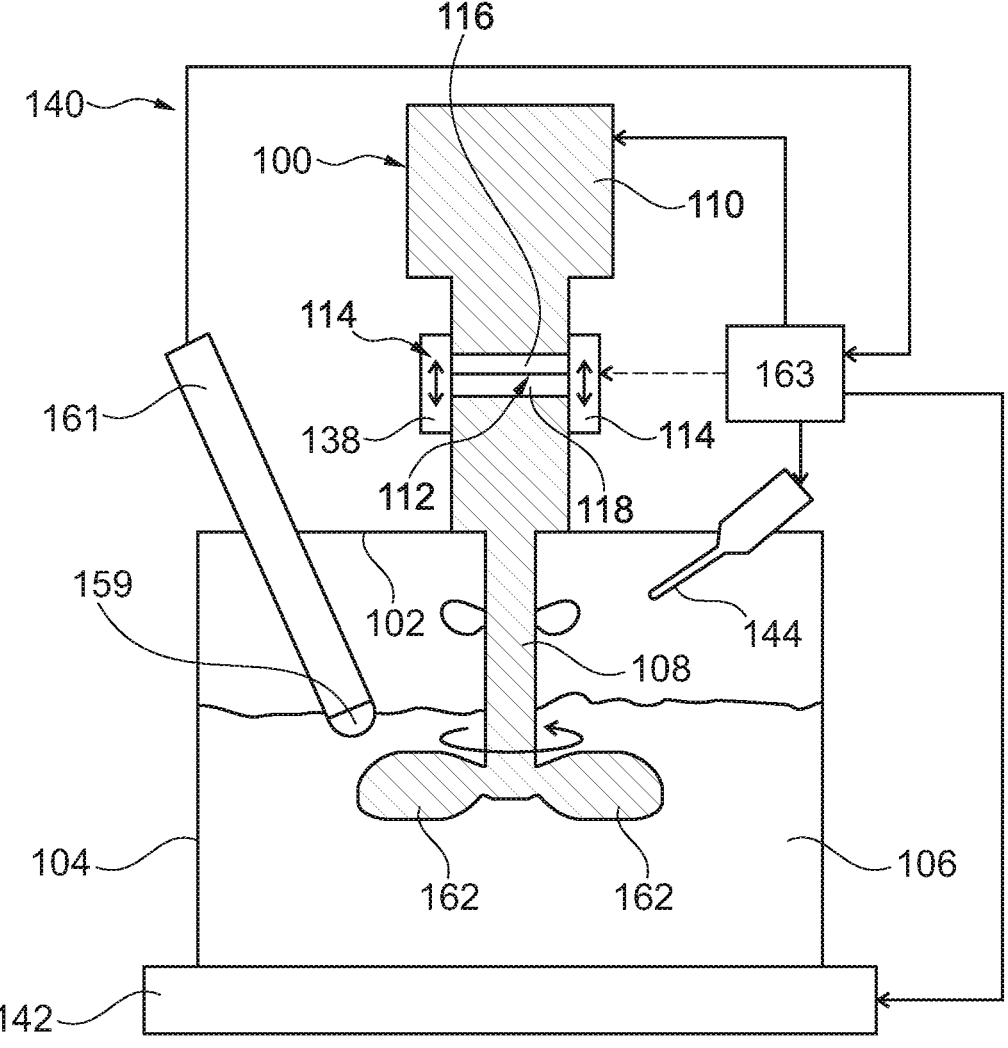
FIG. 1 shows a cross-sectional view of a flash point determination apparatus according to an exemplary embodiment of the invention.

FIG. 1 shows a cross-sectional view of a flash point determination apparatus 140 according to an exemplary embodiment of the invention, by which a flash point determination or a combustion point determination may be selectively performed.

The flash point determination apparatus 140 comprises a crucible or container 104 for receiving a liquid sample 106 to be examined (for example diesel). A lid 102 which is detachable from the container 104 serves for closing the container 104 during the measurement.

A stirring device 100 is provided in the container 104 which is closable by the lid 102 for stirring the sample 106.

The container 104 is thermally coupled with a tempering unit 142 for tempering (in particular heating) the sample 106 which is arranged in the container 104, wherein the thermal coupling may be performed directly or indirectly via an air gap which is not shown here between the tempering unit 142 and the container 104. By the tempering unit 142, the sample 106 may be brought to a desired temperature.

Furthermore, an ignition device 144 for igniting the gas-air-sample-mixture which is formed above the sample 106 is inserted in the container 104.

According to FIG. 1, a stirring unit 108 of the stirring device 100 may be fixedly attached at the lid 102.

Said stirring unit 100 of the flash point determination apparatus 140 serves for stirring the sample 106 which is filled in the container 104 which is closed by the detachable lid 102. For a flash point determination test and/or a combustion point determination test, it may be desirable or required, to stir the sample 106, For this purpose, the stirring device 100 comprises a stirring unit 108 in an, according to FIG. 1, lower region of the stirring device 100. For stirring the sample 106 which is arranged in the container 104, the stirring unit 108 extends at least partially through the lid 102, i.e. is arranged partially above and partially below the lid 102.

Furthermore, the stirring device 100 comprises a drive unit 110 which is arranged outside of the lid 102 according to FIG. 1, for driving the stirring unit 108. The drive unit 100 may comprise a motor (not shown) which rotates a drive shaft of the drive unit 110. By force transfer from the drive unit 110 to the stirring unit 108, also the stirring unit 108 may be set into rotation, whereby the sample 106 is stirred.

A coupling unit 112 of the stirring device 100 functions selectively and/or selectably for mechanically coupling the stirring unit 108 with the drive unit 110, or for mechanically decoupling the stirring unit 108 from the drive unit 110.

Moreover, the stirring device 100 contains an actuation unit 114 which is actuatable for adjusting the coupling unit 112 and is displaceable in the vertical direction for this purpose, as illustrated with double arrows. The actuation unit 114 may be selectively brought in a first actuation position, in which, when pulling up the drive unit 110, the lid 102 may be detached from the container 104 commonly with the stirring unit 108. In contrast, in a second actuation position of the actuation unit 114, when pulling up the drive unit 110, the drive unit 110 may be detached from the container 104, whereas the stirring unit 108 and the lid 102 remain at the container 104.

The flash point determination apparatus 140 which is shown in a sectional view in FIG. 1, which is in particular also configured for a combustion point determination, encompasses the container 104 for receiving the sample 106 to be examined, which is in a liquid state. Furthermore, the flash point determination apparatus 140 encompasses the tempering unit 142 for tempering the sample 106 which is arranged in the container 104. The flash point determination apparatus 140 further encompasses the ignition device 144, which is provided for igniting the gas-air-mixture which is formed above the sample 106. The stirring device 100 serves for stirring the sample 106. Furthermore, a flash point and temperature detector 161 with a temperature probe 159 is provided which protrudes up into the liquid part of the sample 106.

For the flash point determination and/or combustion point determination, the sample 106 in the container 104 is heated by the tempering unit 142. By the temperature probe 159, the temperature of the sample 106 in the container 104 may be detected. By rotationally driving stirring blades 162 at the end of the stirring unit 108, which end is at the side of the container, the sample 106 may be set into motion. By the ignition unit 144, an ignition may be generated, to determine the flash point or combustion point of the gas-air-mixture which is formed above the sample 106.

The control of the flash point determination apparatus 140 is performed by a control unit 163 (for example a processor). The control unit 163 controls the drive unit 110, the ignition unit 144, and the tempering unit 142. Furthermore, the control unit 163 may receive and process signals of the flash point and temperature detector 161. Optionally, the control unit 163 may actuate the actuation unit 114, although this action is performed by a user in preferred embodiments.

In order to adjust, if, when detaching the drive unit 110 from the container 104, the lid 102 may be detached with the stirring unit 108 or not, it is sufficient, that a user displaces the sleeve-type actuation unit 114 upwardly and/or downwardly by hand. If the sleeve 138 is in a first actuation position, a first component 116 of a coupling unit 112, which first component 110 is connected with the drive unit 110, cannot be decoupled from a second component 118 of the coupling unit 112 which is attached at the stirring unit 108. Pulling out the drive unit 110 also pulls the stirring unit 108 with the lid 102 upwardly and enables a cleaning of the agitator. In contrast, when the actuation unit 114 is displaced in the second actuation position by axially displacing the sleeve 138, the first component 116 and the second component 118 are decoupled from each other. In this case, removing the drive unit 110 leaves the stirring unit 108 with the lid 102 at the container 104.

Figure 2:
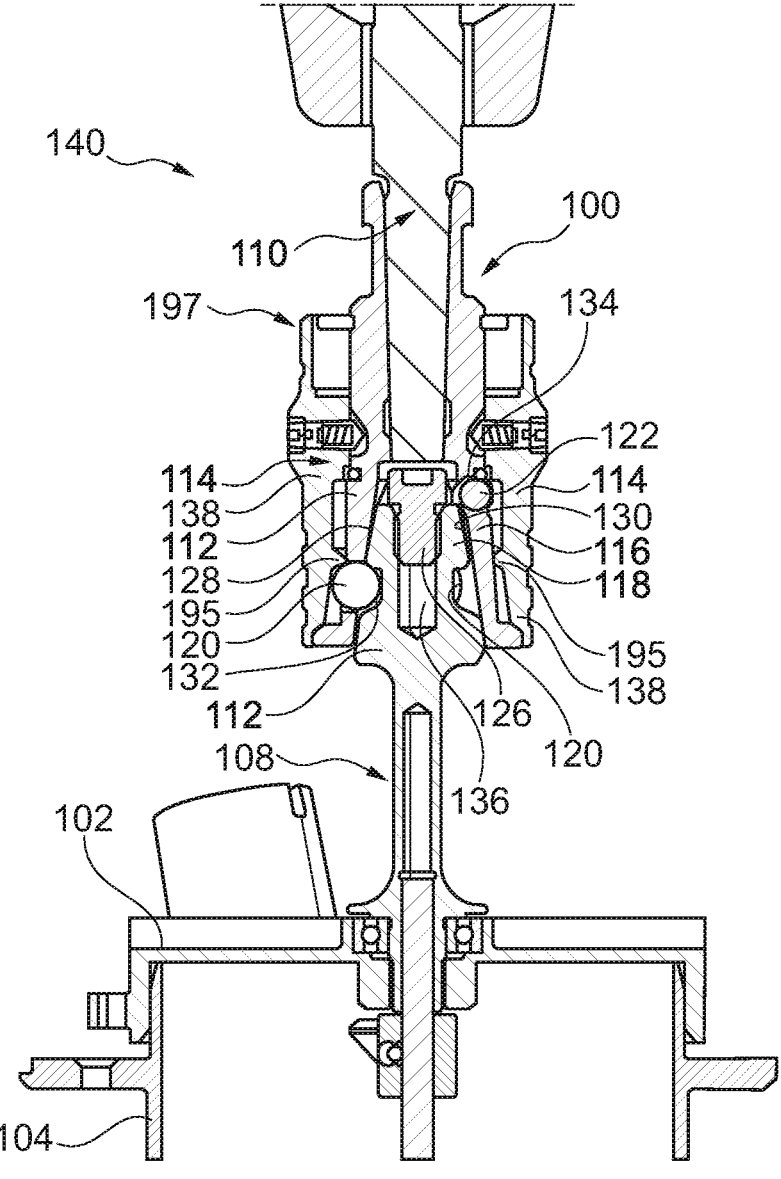
FIG. 2 shows a cross-sectional view of a part of a flash point determination apparatus according to another exemplary embodiment of the invention in a first actuation position.
Figure 3:
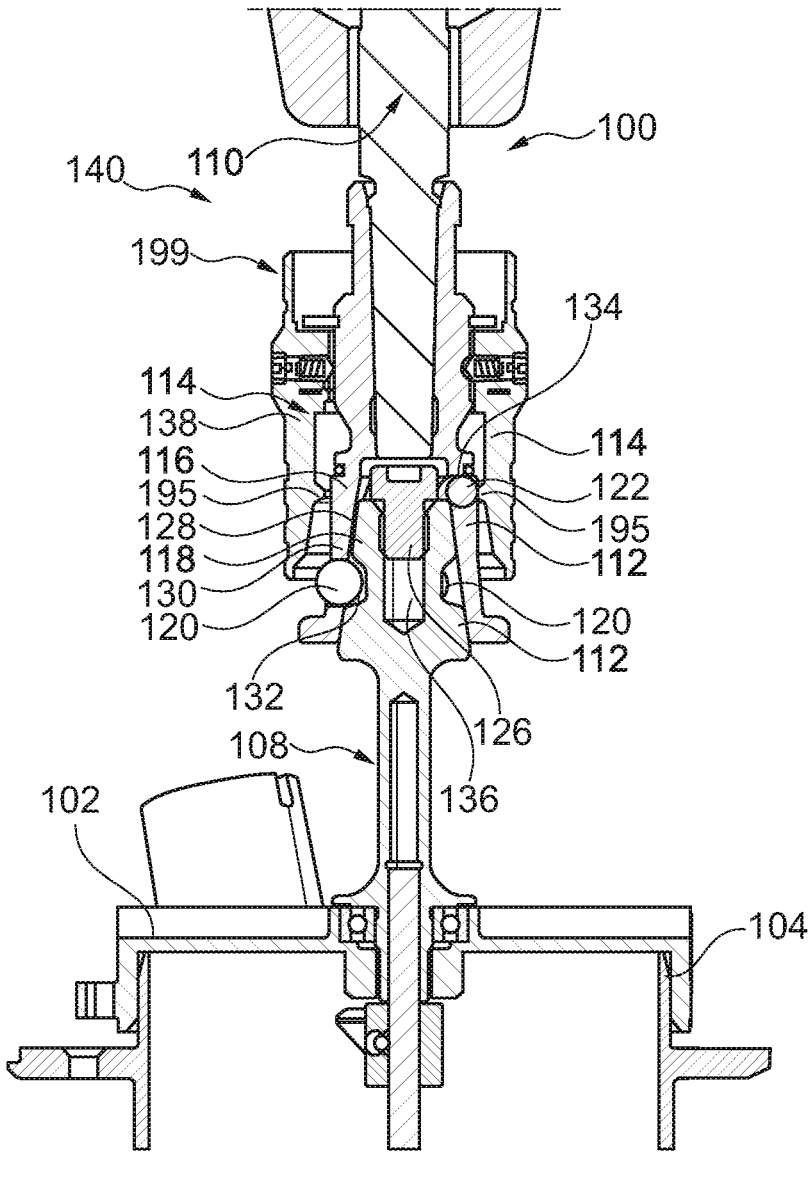
FIG. 3 shows a cross-sectional view of the part of the flash point determination apparatus according to FIG. 2 in a second actuation position.
Figure 4:
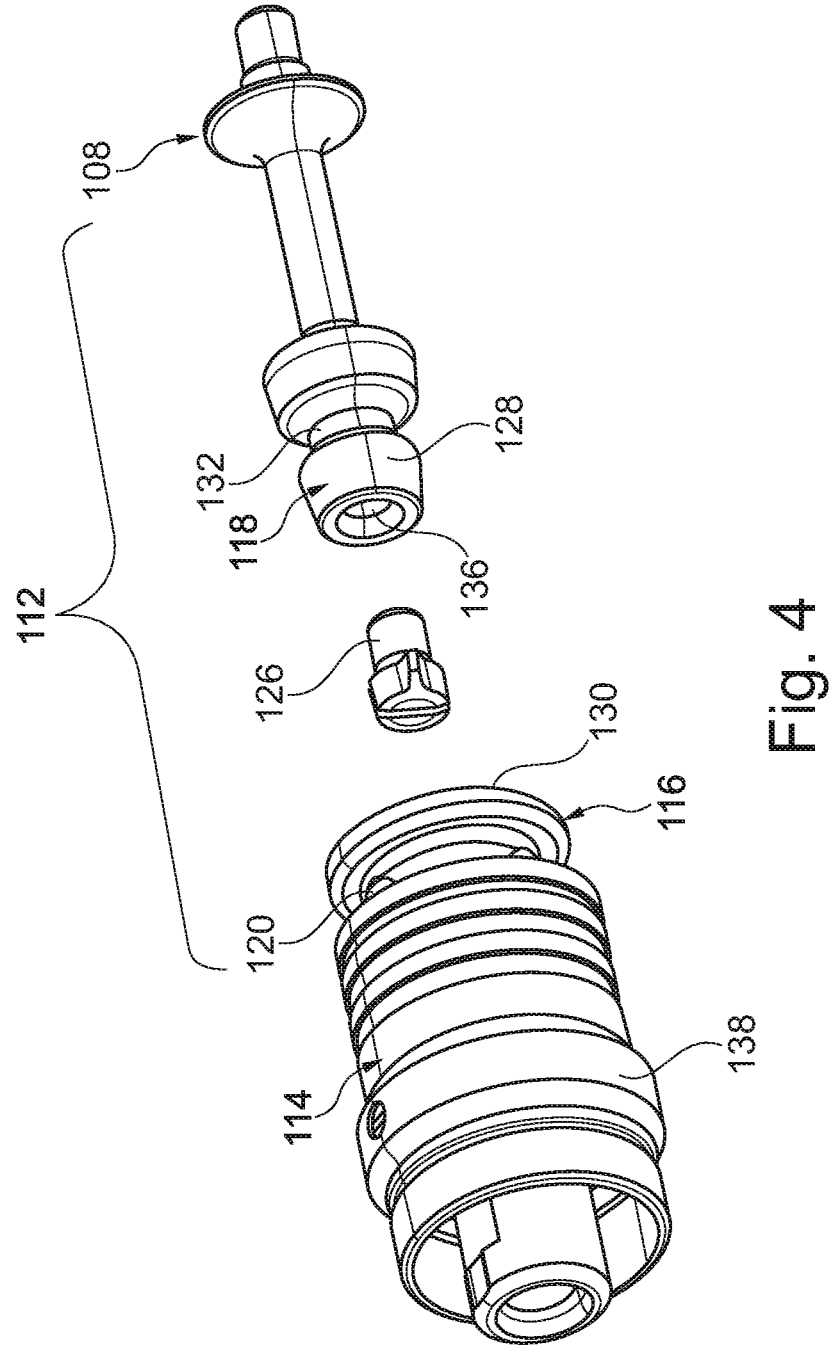
FIG. 4 shows an explosion view of a coupling unit of the flash point determination apparatus according to FIG. 2 and FIG. 3.
Figure 5:
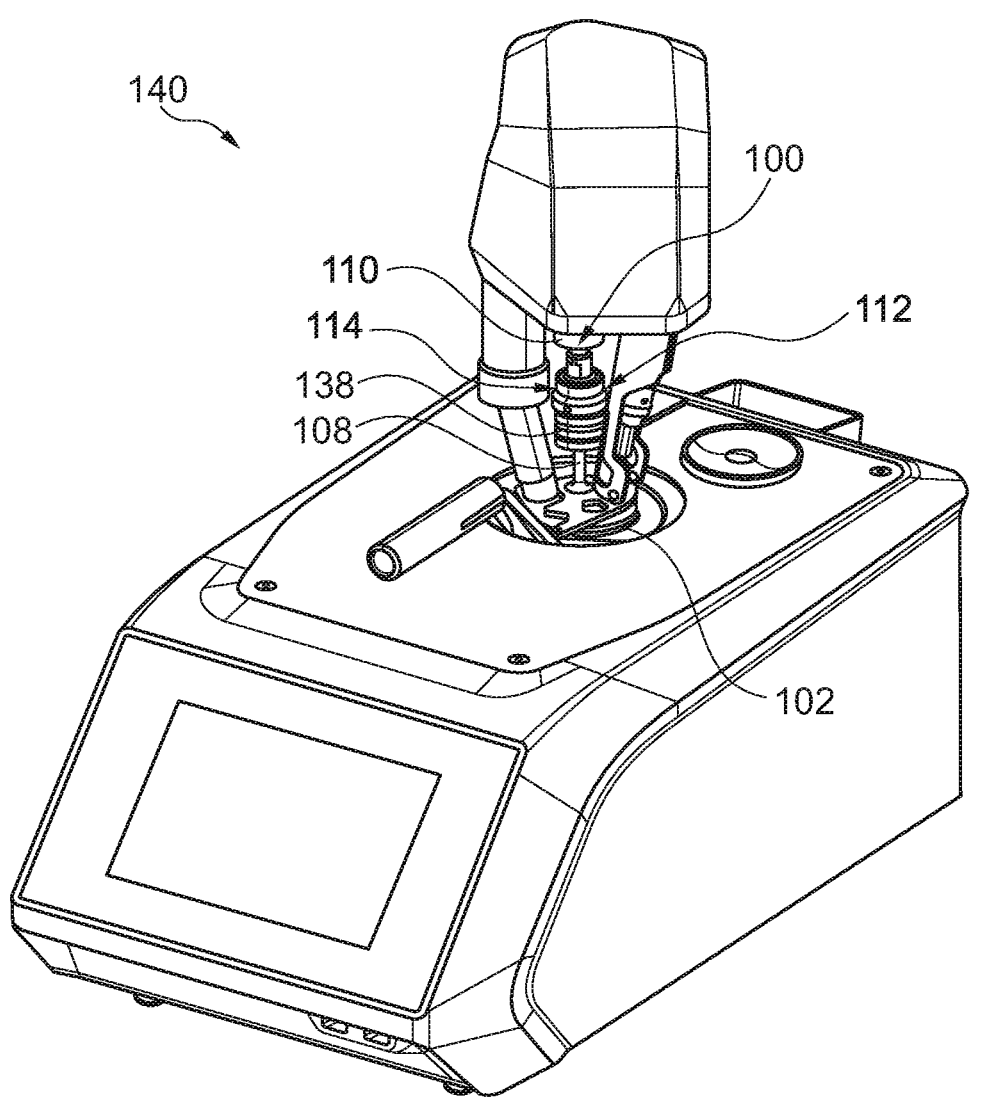
FIG. 5 shows a three-dimensional view of the flash point determination apparatus corresponding to FIG. 2 to FIG. 4.

An example for a corresponding mechanical solution is described in more detail in the following with reference to FIG. 2 to FIG. 5:

FIG. 2 shows a cross-sectional view of a part of a flash point determination apparatus 140 according to an exemplary embodiment of the invention in a first actuation position 197. FIG. 3 shows a cross-sectional view of said part of the flash point determination apparatus 140 according to FIG. 2 in a second actuation position 199. FIG. 4 shows an explosion view of a coupling unit 112 with a carrier 126 of the flash point determination apparatus 140 according to FIG. 2 and FIG. 3, and moreover shows further components (in particular a stirring shaft of a stirring unit 108 and a sleeve 138 of an actuation unit 114). FIG. 5 shows a three-dimensional view of the flash point determination apparatus 140.

Also according to FIG. 2 to FIG. 5, the stirring device 100 comprises a stirring unit 108, a drive unit 110, a coupling unit 112, and an actuation unit 114 for actuating the coupling unit 112, such that selectively the first actuation position 197 (for detaching the lid 102 with the stirring unit 108 commonly with the drive unit 110) which is shown in FIG. 2, or the second actuation position 199 (for detaching the drive unit 110 without the lid 102 and without the stirring unit 108) which is shown in FIG. 3 may be adjusted.

As can be seen in FIG. 2 to FIG. 4, the coupling unit 112 has a first component 116 which is assigned to and integrally formed with the drive unit 110, and a second component 118 which is assigned to and integrally formed with the stirring unit 108.

Moreover, the coupling unit 112 contains first locking bodies 120 which are configured as a surrounding row of first locking balls, which lock the first component 116 with the second component 118 in a torque-transferring manner, when the actuation unit 114 in the first actuation position 197 acts upon the first locking bodies 120. In contrast, the first locking bodies remain the first component 116 and the second component 118 decoupled from each other, when the actuation unit 114 is in the second actuation position 199 and releases the first locking bodies 120.

In addition, the coupling unit 112 contains a carrier 126 for selectively torque-transferring between the first component 116 and the second component 118 in the second actuation position 199. The carrier 126 is provided separately from the stirring unit 108 and the drive unit 110 in this example. Alternatively, the carrier 126 may also be a part of the stirring unit 108.

The coupling unit 112 additionally has second locking bodies 122 which are configured as a surrounding row of second locking balls, which may act upon the carrier 126 in a torque-transferring manner, when the actuation unit 114 in the second actuation position 199 acts upon the second locking bodies 122. In contrast, the second locking bodies 122 do not act upon the carrier 126, when the actuation unit 114 is in the first actuation position 197 and releases the second locking balls 122.

As can be seen in FIG. 2 and FIG. 3, the surrounding row of first locking balls in form of the first locking bodies 120 is below the surrounding row of second locking balls in form of the second locking bodies 122. In other words, the first locking bodies 120 are arranged at the side of the stirrer and the second locking bodies 122 are arranged at the side of the drive.

As can also be seen in FIG. 2 to FIG. 4, the second component 118 has a drive-sidedly tapering outer profile 128, and the first component 116 also has a drive-sidedly tapering inner profile 130 which is corresponding to it, for receiving the tapering outer profile 128, The tapering outer profile 128 has a surrounding indentation 132 for receiving the first locking body 120. In a corresponding manner, the tapering inner profile 130 has a surrounding indentation 134 for receiving the second locking body 122. Moreover, the second component 118 comprises a central recess 136 for receiving the carrier 126.

As well recognizable in FIG. 2 and FIG. 3, the actuation unit 114 is configured as a collar or a sleeve 138 which is circumferentially surrounding the coupling unit 112, which collar or sleeve 138 may additionally surround a part of the stirring unit 108 and a part of the drive unit 110. Said sleeve 138 functions for transferring the stirring device 100 between the first actuation position 197 and the second actuation position 199 and is configured axially displaceable for this purpose. For transferring from the first actuation position 197 to the second actuation position 199, the sleeve 138 may be displaced in the direction of the drive unit 110 and/or for transferring from the second actuation position 199 to the first actuation position 197, may be displaced in the direction of the stirring unit 108. The actuation unit 114 is configured for a manual and advantageously one-handed actuation by a user.

The sleeve 138 is provided with an inner protrusion 195 for acting upon the coupling unit 112. In more detail, the protrusion 195 in the first actuation position 197 may act upon the first locking bodies 120, but not upon the second locking bodies 122. In contrast, the protrusion 195 in the second actuation position 199 may act upon the second locking bodies 122, but not upon the first locking bodies 120.

The embodiment according to FIG. 2 to FIG. 5 descriptively generates a stirrer coupling of a flash point tester according to Pensky and Pensky-Martens. The flash point determination apparatus 140 contains a stirrer coupling which combines the basic functionality of the stirrer and the user-friendly and flexible option for removing the lid 102 when detaching the stirring device 100 (also denoted as co-transport of the crucible lid). The stirring device 100 contains a coupling unit 112 encompassing a carrier 126 for the torque-transfer. The carrier 126 may be screwed with the stirrer shaft of the stirring unit 108. Alternatively, the carrier 126 may also be integrated in the stirrer shaft. The stirring device 100 is illustrated, respectively as longitudinal sectional view, in a coupled state which corresponds to the first actuation position 197 (see FIG. 2) and a decoupled state which corresponds to the second actuation position 199 (compare FIG. 3) of the drive unit 110 and the stirring unit 108. FIG. 4 shows constituents of the interface and coupling unit 112, respectively.

A user may perform a manual option choice and may adjust a performed or prevented co-transport of the crucible lid, by only displacing the sleeve 138 of the actuation unit 114 upwardly and downwardly, respectively. A displacement "upwardly" and "downwardly" denotes a displacement in the axial direction. "Up" and "down" denote directions at a point in time, while the flash point determination apparatus 140 is in operation.

The stirrer coupling may be both completely visibly (see for example FIG. 5) and partially invisibly installed in the flash point determination apparatus 140. Thus, FIG. 5 shows an installation example of the assembly of the stirrer coupling and the stirring device 100, respectively. Preferably, the coupling position is positioned, such that it is easily accessible, to be able to simply activate and deactivate the option of the co-transport of the crucible lid.

The choice of the option of the co-transport of the crucible lid is performable by one hand in the illustrated example, as soon as the coupling unit 112 is directly attached to the stirring device 100. The outer sleeve 138 may be manually pushed downwardly, i.e. transferred to the first actuation position 197, prior to the start of the flash point measurement. This is performable by one hand. The lower ball row of the first locking bodies 120 of the coupling unit 112 is locked towards the center of rotation by the sleeve 138. Thereby, the placed stirrer shaft is pushed into the cone reception of the coupling unit 112 and the locking bodies

120 are pushed into a cone groove. The generated force-fit between the components 116, 118, 120 of the coupling unit 112 causes a torque-transfer on the stirrer unit 108 and additionally enables a co-transport of the lid 102 of the container 104 by the device head. The coupling remains in this state, until the sleeve 138 is manually pushed upwardly again, i.e. is transferred to the second actuation position 199. In this case, the lower ball row of the first locking bodies 120 is released and the upper ball row of the second locking bodies 122 in turn is locked towards the center of rotation. The torque-transfer is performed as soon as a locked ball abuts against the carrier 126 and transfers the rotational motion to the stirrer shaft. Since the force-fit between the components 116, 118, 120 of the coupling unit 112 is repealed, in this state, the lid 102 of the crucible or container 104 is not co-transported when lifting the head.

When the sleeve 138 is in the lower position (FIG. 2), the balls of the first locking bodies 120 are pushed into the recess or indentation 132 and the shaft is fixed to the upper part of the flash point determination apparatus 140. The lid 102 is co-transported when displacing upwardly.

In contrast, when the sleeve 138 is in the upper position (FIG. 3), the balls of the first locking bodies 120 are released and the balls of the second locking bodies 122 are fixed. The latter serves for a force-transfer to the carrier 126 in the center of the flash point determination apparatus 140. In the case of pulling up, the lid 102 remains placed on the container 104. This simply operable, optional co-transport of the lid constitutes a significant advantage of an embodiment of the invention.

Thus, when the sleeve 138 is in the position according to FIG. 2, by detaching the drive unit 110, also the stirring unit 108 with the lid 102 may be detached from the container 104, to clean the stirring unit 108. In contrast, in the position according to FIG. 3, detaching the drive unit 110 without the co-transport of the stirring unit 108 is enabled. As shown in FIG. 5, for transferring the flash point determination apparatus 140 between both actuation positions 197, 199 according to FIG. 2 and FIG. 3, it is sufficient to displace the sleeve 138 in the axial direction.

The stirring device 100 which is shown in FIG. 2 to FIG. 5 provides a comfortable operation possibility for a user, since the user, by merely moving the sleeve 138 upwardly and downwardly, may select, if the stirring unit 108 and the drive unit 110 may be commonly detached from the container 104 (operational state according to FIG. 2) or only the drive unit 110 may be detached from the container 104, while the stirring unit 108 remains at the container 104 (operational state according to FIG. 3). This mode of operation is caused by the cooperation of the locking bodies 120, 122 and the carrier 126, wherein it may be acted upon the mentioned component parts by merely vertically displacing the sleeve 138 in a corresponding manner. The lower or first locking bodies 120 which are configured as locking balls cause a force-fit, when the sleeve 138 is displaced downwardly (compare FIG. 2). In this operational state, the lower or second locking bodies 122 are freely movable and functionally without importance. By this torque-coupling, which is also generated in this operational state, between the stirring unit 108 and the drive unit 110, stirring is enabled, wherein the lid 102 is co-transported, when detaching the head of the stirring device 100 and therefore the drive unit 110. When the sleeve 138 is displaced upwardly according to FIG. 3, the upper or second locking bodies 122 are locked and co-transport the nose or the carrier 126. The lower or first locking bodies 120 are functionally without importance in this operational state. Therefore, in the axially decoupled state between the stirring unit 108 and the drive unit 110, a torque-coupling between the stirring unit 108 and the drive unit 110 still remains enabled, and therefore stirring is possible regardless of the axial decoupling between the stirring unit 108 and the drive unit 110. Therefore, both in the decoupled state between the stirring unit 108 and drive unit 110 according to FIG. 3 and in the coupled state between the stirring unit 108 and the drive unit 110 according to FIG. 2, a torque-transfer for stirring is enabled. Descriptively, the upper ball row in form of the second locking bodies 122 causes a form-fit, whereas the lower ball row in form of the first locking bodies 120 serves for a force-fit when stirring. The carrier 126 allows a torque-transfer to the stirring shaft by the second locking bodies 122, when the sleeve 138 is displaced upwardly for co-transporting the carrier 126. When the sleeve 138 is in the lower state, a force-fit may be accomplished by the first locking bodies 120.

By the described cooperation of the coupling unit 112 and the actuation unit 114, both in the first actuation position 197 and in the second actuation position 199, a transfer of torque from the drive unit 110 to the stirring unit 108 is performed, whereby stirring is enabled in both actuation positions 197, 199. In contrast, only in the first actuation position 197, the drive unit 110 and the stirring unit 108 are coupled with each other in an axially undetachable manner. In contrast, in the second actuation position 199, the drive unit 110 and the stirring unit 108 are decoupled from each other in an axially detachable manner.

Figure 6:
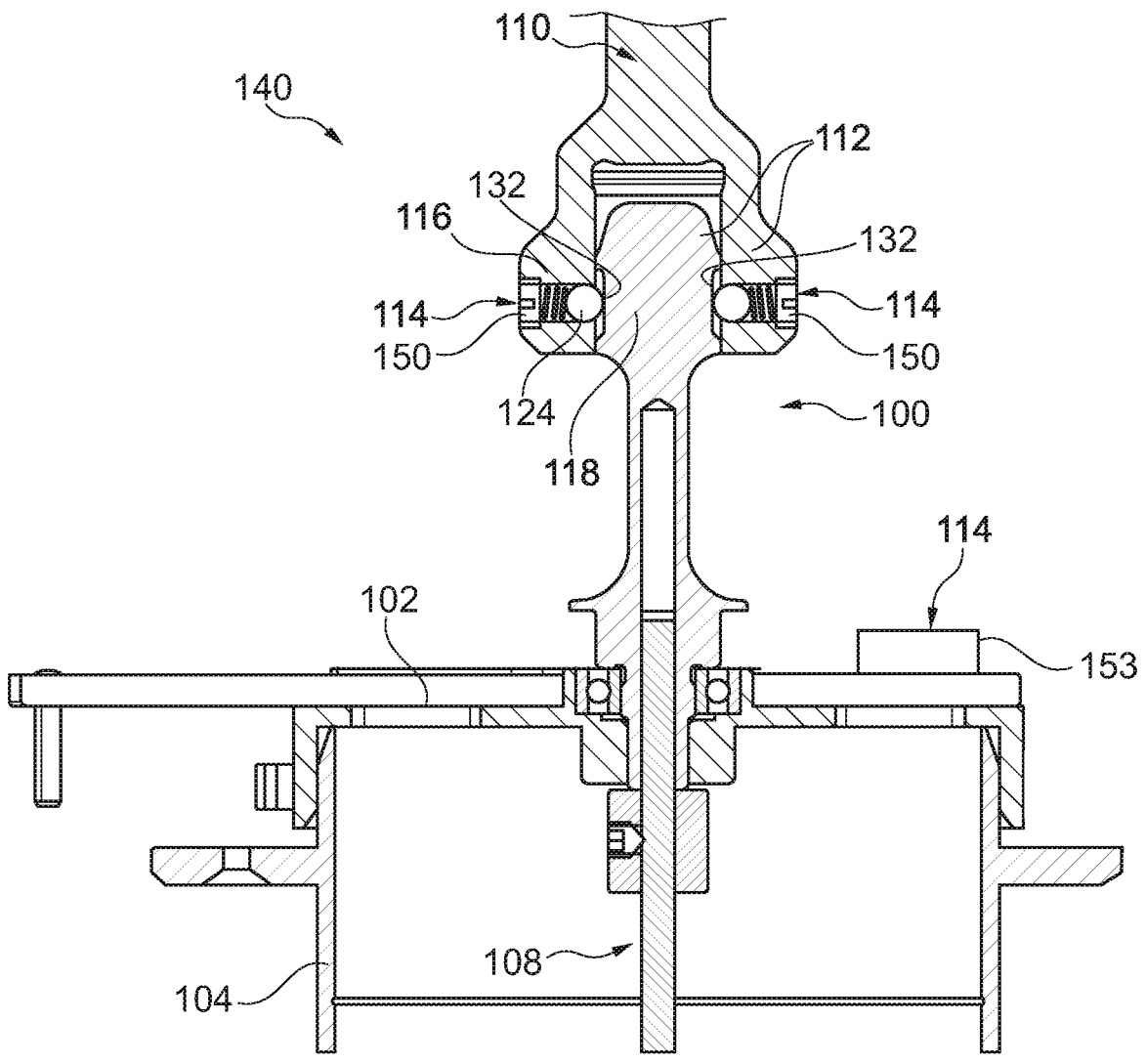
FIG. 6 shows a cross-sectional view of a flash point determination apparatus according to another exemplary embodiment of the invention in a mounted state.
Figure 7:
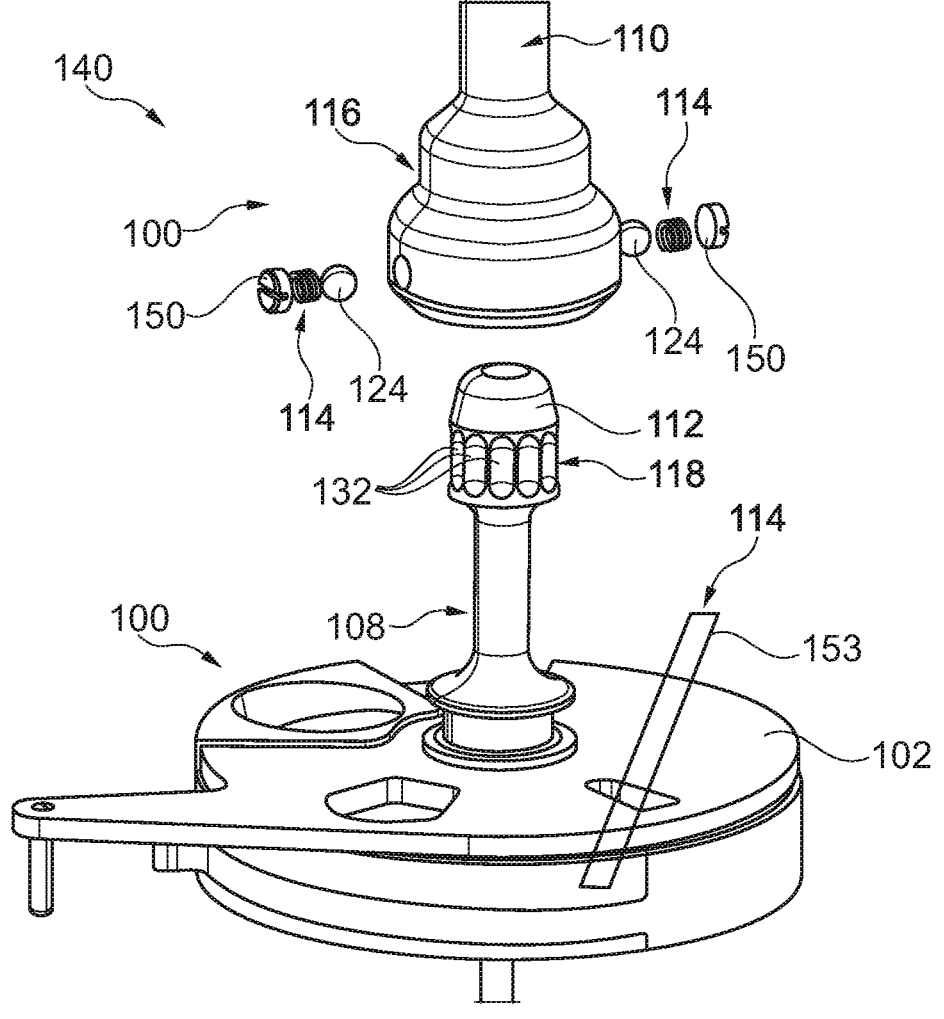
FIG. 7 shows a three-dimensional view of the flash point determination apparatus according to FIG. 6 in a demounted state.

FIG. 6 shows a cross-sectional view of a flash point determination apparatus 140 according to another exemplary embodiment of the invention in a mounted state. FIG. 7 shows a three-dimensional view of the flash point determination apparatus 140 according to FIG. 6 in a demounted state.

According to FIG. 6 and FIG. 7, the coupling unit 112 has locking bodies 124 which are loadable with a biasing force, for torque-transferringly locking the first component 116 with the second component 118. Moreover, the actuation unit 114 according to FIG. 6 and FIG. 7 comprises actuation elements 150 (here configured as actuation screws). These serve for locking the locking bodies 124 by attaching the locking bodies 124 to the first component 116 and the second component 118 in the first actuation position 197, Unlocking the locking bodies 124 is performed by removing the locking bodies 124 from the first component 116 and/or the second component 118 in the second actuation position 199.

Alternatively, the actuation element 114 may be configured as a locking element 153 with a latch which may be brought in a position by a user, in which it locks the lid and therefore prevents the co-transport of the crucible lid. In this case, the user does not have to actuate any screws.

Therefore, FIG. 6 and FIG. 7 illustrate an embodiment with an automatic co-transport of the crucible lid, which nevertheless may be switched off or deactivated by the actuation elements 150 and/or the crucible lid locking.

In such an automatized co-transport of the lid 102 of the container 104, the flash point determination apparatus 140 automatically couples the crucible lid 102 with the drive unit 110. In the illustrated embodiment, the coupling of the head with the sample insert is performed automatically. Furthermore, decoupling the lid 102 may be performed by simply pulling down without the need to additionally unlock and/or move component parts of the coupling. Such a coupling may be realized by a spring-loaded ball row in form of the locking bodies 124 in cooperation with the actuation elements 150, In the automatic co-transport of the crucible lid, said spring-loaded ball row is positioned in the drive shaft. When coupling, the drive shaft pushes in elongated hole grooves of the stirrer shaft and transfers the drive torque to the stirrer. Moreover, thereby, the automatic co-transport of the crucible lid through the device head and/or the part of the device in which the drive unit 110 is located may be enabled. This spring-loaded ball row prevents a slipping out of the stirrer shaft and of the lid 102 and carries them along when displacing the device head upwardly. FIG. 6 in particular shows a cross-section of the coupling for the automatized co-transport of the crucible lid.

The embodiment according to FIG. 6 and FIG. 7 enables simply connecting the components 116, 118 by inserting the locking bodies 124 and the biasing elements which are configured as coil springs by actuating the actuation element 150 which is configured as actuation screw. When the actuation element 150 is screwed in a receiving opening of the first component 116, a respective locking ball as locking body 124 pushes in a recess of the second component 118. Thereby, the components 116, 118 are locked to each other. Detaching the drive unit 110 then also leads to a co-transport of the stirring unit 108. In contrast, when the actuation element 150 which is configured as actuation screw is not screwed in the reception of the first component 116, the locking ball 124 does not push into the groove of the second component 118. Detaching the drive unit 110 then retains the stirring unit 108 at the container 104.

FIG. 7 further shows, that in the circumferential direction, the indentation 132 at the second component 118 is configured as a sequence of indentations which are arranged in the circumferential direction with bars which are arranged in between. A locking body 124 which is configured as locking ball may then be inserted into an arbitrary indentation, to connect both components 116, 118 with each other.

With reference sign 153, an optional locking unit 153 of the actuation unit 114 is illustrated in FIG. 6 and FIG. 7. By an actuation of the locking unit 153 by a user, selectively the lid 102 may be locked at the container 104, to make a co-transport of the crucible lid impossible, or the lid 102 may be unlocked with respect to the container 104, to enable a co-transport of the crucible lid. For example, the locking unit 153 may be configured as a mechanic or magnetic latch.

Supplementary, it is to be noted that "comprising" does not exclude other elements or steps and "a" or "an" does not exclude a plurality. Furthermore, it is noted, that features or steps which are described with reference to one of the above embodiments, may also be used in combination with other features or steps of other above described embodiments. Reference signs in the claims are not to be construed as limitation.

The invention claimed is:

1. A flash point determination apparatus, wherein the flash point determination apparatus comprises:

a container for receiving a sample to be examined;

a lid for closing the container; and a stirring device for stirring the sample in the container, wherein the stirring device comprises:

a stirring unit which may extend at least partially through the lid for stirring the sample which is arranged in the container;

a drive unit which is to be arranged at least partially outside of the lid, for driving the stirring device;

a coupling unit for coupling the stirring unit with the drive unit; and an actuation unit which is actuatable, for adjusting the coupling unit, such that selectively:

in a first actuation position, when pulling up the drive unit, the lid is detachable from the container commonly with the stirring unit; or in a second actuation position, when pulling up the drive unit, the drive unit is detachable from the container and the stirring unit and the lid remain at the container, wherein the coupling unit and the actuation unit are configured in a cooperating manner, such that:

in the first actuation position, the drive unit and the stirring unit are coupled with each other in an axially undetachable manner, and in the second actuation position, the drive unit and the stirring unit are decoupled from each other in an axially detachable manner.

2. The flash point determination apparatus according to claim 1, wherein the coupling unit comprises:

a first component which is assigned to the drive unit, and a second component which is assigned to the stirring unit.

3. The flash point determination apparatus according to claim 2, wherein the coupling unit comprises at least one first locking body, wherein the at least one first locking body is configured to locks the first component with the second component, when the actuation unit in the first actuation position is configured to act upon the at least one first locking body; and wherein the at least one first locking body is configured to remain the first component and the second component unlocked, when the actuation unit is in the second actuation position and releases the at least one first locking body.

4. The flash point determination apparatus according to claim 3, wherein the actuation unit comprises a sleeve which at least partially surrounds the coupling unit.

5. The flash point determination apparatus according to claim 4, comprising at least one of the following features:

wherein the sleeve is configured axially displaceable for transferring between the first actuation position and the second actuation position;

wherein the sleeve comprises at least one inner protrusion for acting upon the at least one first locking body and/or an at least one second locking body and/or the coupling unit.

6. The flash point determination apparatus according to claim 2, wherein the coupling unit comprises a carrier for selectively transferring a torque between the first component and the second component, wherein the carrier is provided separately from the stirring unit and the drive unit.

7. The flash point determination apparatus according to claim 6, wherein the coupling unit comprises at least one second locking body, wherein the at least one second locking body is configured to act upon the carrier, in a torque-transferring manner, when the actuation unit in the second actuation position acts upon the at least one second locking body.

8. The flash point determination apparatus according to claim 7, wherein the at least one second locking body is configured to not to act upon the carrier in a torque-transferring manner, when the actuation unit is in the first actuation position and releases the at least one second locking body.

9. The flash point determination apparatus according to claim 2, wherein the second component comprises a tapering outer profile, and the first component comprises a tapering inner profile for receiving the tapering outer profile.

10. The flash point determination apparatus according to claim 9, wherein the tapering outer profile comprises an indentation for receiving the at least one first locking body.

11. The flash point determination apparatus according to claim 9, wherein the tapering inner profile comprises an indentation for receiving the at least one second locking body.

12. The flash point determination apparatus according to claim 7, wherein the second component comprises a central recess for receiving at least a part of the carrier.

13. The flash point determination apparatus according to claim 2, wherein the coupling unit comprises at least one locking body for locking the first component with the second component;

wherein the actuation unit comprises at least one actuation element configured for locking the at least one locking body by attaching the at least one locking body to at least one of the first component and the second component in the first actuation position, and for unlocking the at least one locking body by removing the at least one locking body from the first component and/or the second component in the second actuation position.

14. The flash point determination apparatus according to claim 2, wherein the actuation unit comprises a locking unit which may be brought selectively in the first actuation position or in the second actuation position.

15. The flash point determination apparatus according to claim 1, wherein the actuation unit is configured for a manual actuation by a user.

16. The flash point determination apparatus according to claim 1, wherein the coupling unit and the actuation unit are configured in a cooperating manner, such that:

in the first actuation position, a transfer of torque from the drive unit to the stirring unit is enabled.

17. The flash point determination apparatus according to claim 1, comprising:

a tempering unit for tempering the sample which is arranged in the container; and an ignition device for igniting the sample which is arranged in the container.

18. The flash point determination apparatus according to claim 17, wherein the stirring unit is fixedly attached to the lid.

19. A method for performing one of a flash point determination test and a combustion point determination test of a sample in a container, wherein a lid for closing the container and a stirring device for stirring the sample in the container are provided, wherein the method comprises a method for stirring the sample in the container closed by the lid, wherein the method for stirring the sample comprises:

at least partially guiding a stirring unit through the lid into the sample in the container for stirring the sample;

driving the stirring unit by a drive unit which is at least partially arranged outside of the lid, for stirring the sample by the stirring unit;

coupling the stirring unit with the drive unit by a coupling unit; and actuating an actuation unit such that selectively:

in a first actuation position, when pulling up the drive unit, the lid is detached from the container commonly with the stirring unit; or in a second actuation position, when pulling up the drive unit, the drive unit is detached from the container, and the stirring unit and the lid remain at the container, wherein the coupling unit and the actuation unit are configured in a cooperating manner, such that:

in the first actuation position, the drive unit and the stirring unit are coupled with each other in an axially undetachable manner, and in the second actuation position, the drive unit and the stirring unit are decoupled from each other in an axially detachable manner.

20. The method according to claim 19, wherein the method further comprises one-handedly actuating the actuation unit for adjusting the coupling unit by a user.

\* \* \* \* \*